(12) United States Patent
Hoffman et al.

(10) Patent No.: US 11,313,212 B1
(45) Date of Patent: Apr. 26, 2022

(54) PRE-HYDRATION OF FRICTION REDUCERS FOR WELLBORE FLUIDS

(71) Applicant: Halliburton Energy Services, Inc., Houston, TX (US)

(72) Inventors: Karl H Hoffman, Houston, TX (US); Chunli Li, Houston, TX (US); Liang Xu, Houston, TX (US); Darrell Griffin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/224,538

(22) Filed: Apr. 7, 2021

(51) Int. Cl.
  *E21B 43/26* (2006.01)
  *C09K 8/68* (2006.01)
  *E21B 43/267* (2006.01)
  *C09K 8/80* (2006.01)

(52) U.S. Cl.
  CPC ............ *E21B 43/2607* (2020.05); *C09K 8/68* (2013.01); *C09K 8/80* (2013.01); *E21B 43/267* (2013.01); *C09K 2208/28* (2013.01)

(58) Field of Classification Search
  None
  See application file for complete search history.

(56) References Cited

U.S. PATENT DOCUMENTS

| | | | | |
|---|---|---|---|---|
| 3,601,079 A | * | 8/1971 | Giles | B01F 15/0206 114/67 R |
| 5,067,508 A | * | 11/1991 | Lee | F17D 1/17 137/13 |
| 2009/0023615 A1 | * | 1/2009 | Chen | C09K 8/035 507/219 |
| 2010/0132949 A1 | * | 6/2010 | DeFosse | E21B 43/26 166/308.1 |
| 2012/0018148 A1 | * | 1/2012 | Bryant | C09K 8/62 166/250.01 |

* cited by examiner

*Primary Examiner* — Andrew Sue-Ako
(74) *Attorney, Agent, or Firm* — Sheri Higgins Law, PLLC; Sheri Higgins (57) ABSTRACT

Friction reducers can be used in fluids for oil and gas operations. Friction reducers can be water-hydratable and can decrease the friction within wellbore components after fully hydrating. The friction reducer can be pre-hydrated at the well site. The friction reducer and water can be combined into a static mixer of a pre-hydration apparatus that forms a mixed fluid. The friction reducer can be retained in the pre-hydration apparatus for a sufficient period of time to allow the friction reducer to hydrate. The mixed fluid containing the pre-hydrated friction reducer can then be added to a base fluid to form a treatment fluid. The treatment fluid can be a fracturing fluid. The pre-hydrated friction reducer can provide an immediate reduction in friction to the treatment fluid as the treatment fluid is being pumped into the wellbore.

18 Claims, 4 Drawing Sheets

PRE-HYDRATION OF FRICTION REDUCERS FOR WELLBORE FLUIDS

TECHNICAL FIELD

Enhanced recovery of oil or gas from a subterranean formation can utilize stimulation techniques. Stimulation techniques can include fracturing operations. A fracturing fluid can include a variety of additives, such as friction reducers, to provide desirable properties to the fracturing fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of about 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a liquid external phase and undissolved solid particles as the internal phase; an emulsion, which includes a liquid external phase and at least one internal phase of immiscible liquid droplets; a foam, which includes a liquid external phase and a gas as the internal phase; or a mist, which includes a gas external phase and liquid droplets as the internal phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a wellbore" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and stimulation fluids. As used herein, a "treatment fluid" is a fluid designed and prepared to resolve a specific condition of a well or subterranean formation, such as for stimulation, isolation, gravel packing, or drilling. The term "treatment fluid" refers to the specific composition of the fluid as it is being introduced into a well. The word "treatment" in the term "treatment fluid" does not necessarily imply any particular action by the fluid.

A common stimulation treatment is a fracturing operation. For fracturing operations, a fracturing fluid "frac fluid" is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. Fracturing a subterranean formation typically requires hundreds of thousands of gallons of fracturing fluid. Moreover, it is often desirable to conduct a fracturing operation at more than one downhole location.

The newly created or enhanced fracture may tend to close together after pumping of the fracturing fluid has stopped. To prevent the fracture from closing, a material can be placed in the fracture to keep the fracture propped open. A material used for this purpose is often referred to as proppant. The proppant is in the form of solid sand or ceramic particles that are generally suspended in the fracturing fluid, carried down hole, and deposited in the fracture as a proppant pack. The proppant pack props the fracture in an open position while allowing fluid flow through the permeability of the pack.

Fracturing fluids can be pumped at a variety of flow rates. In order to pump the frac fluid at the required flow rate, a friction reducer can be added. The friction reducer functions to decrease the friction of the frac fluid against tubing strings and other wellbore equipment. Some friction reducers can reduce friction pressures by up to about 70% to 80%.

A treatment fluid must also be pumpable. Therefore, it is desirable that the treatment fluid have a desired viscosity in order for the fluid to be pumpable. Viscosity is a measure of the resistance of a fluid to flow, defined as the ratio of shear stress to shear rate. Viscosity can be expressed in units of (force×time)/area. For example, viscosity can be expressed in units of dyne s/cm$^2$ (commonly referred to as Poise [P]), or expressed in units of Pascals/second (Pa/s). However, because a material that has a viscosity of 1 P is a relatively viscous material, viscosity is more commonly expressed in units of centipoise (cP). One cP equals $\frac{1}{100}$ P.

Some friction reducers hydrate in water to provide a desired percentage of friction reduction. It is theorized that these types of friction reducers must hydrate sufficiently before a decrease in friction can occur. The desired percentage of friction reduction is generally at least 40% depending on the specific conditions of the well and the oil and gas operation to be performed. The friction reducer may need to fully hydrate before a maximum friction reduction can occur. The time at which a reduction in friction exceeds at least 40% can indicate the "initial hydration time." The time at which a reduction in friction reaches the maximum percent can indicate the "final hydration time." By way of example, it may take 1 minute (min.) after addition of the friction reducer to a treatment fluid to achieve a 40% friction reduction, but may take 15 min. to achieve the maximum friction reduction, such as 75%.

Friction reducers included in friction-reducer emulsions or slurries generally require more time to hydrate in water and chemically activate before the friction reducer reaches the maximum percent of friction reduction. During this time, the pump may need to be operated at a lower flow rate in order to maintain the desired pressure in the wellbore, which can place mechanical stress on the pump. Thus, there is a need and an ongoing industry-wide concern to provide more immediate friction reduction when introducing a treatment fluid containing a friction reducer into a wellbore.

A system for treating a subterranean formation can include: a pre-hydration apparatus comprising: a first inlet configured to introduce a friction reducer into the apparatus; a second inlet configured to introduce a fluid comprising water into the apparatus; a mixer, wherein the static mixer mixes the friction reducer and the fluid to form a mixed fluid; and an outlet; a base fluid; a wellbore, wherein the wellbore penetrates the subterranean formation; and a pump and blender apparatus configured to: receive the base fluid and the mixed fluid via the outlet; blend the base fluid and the mixed fluid to form a treatment fluid; and pump the treatment fluid into the wellbore.

Methods of treating a subterranean formation can include: pre-hydrating a friction reducer, wherein the friction reducer is a polymer, and wherein the friction reducer is hydratable in water; adding the pre-hydrated friction reducer to a treatment fluid; and introducing the treatment fluid into the subterranean formation.

It is to be understood that the discussion of pre-hydrating the friction reducer is intended to apply to all of the system and method embodiments without the need to repeat the various embodiments throughout. Any reference to the unit "gallons" means U.S. gallons.

It is to be understood that while the treatment fluid can contain other ingredients, it is the pre-hydrated friction reducer that is primarily or wholly responsible for providing the desired percentage friction reduction to the treatment fluid. For example, a test treatment fluid consisting essentially of, or consisting of, the base fluid and the pre-hydrated friction reducer and in the same proportions as the treatment fluid can exhibit the desired percentage friction reduction. Therefore, it is not necessary for the treatment fluid to include other additives to provide the desired percentage friction reduction to the treatment fluid. It is also to be understood that any discussion related to a "test treatment fluid" is included for purposes of demonstrating that the treatment fluid can contain other ingredients, but it is the pre-hydrated friction reducer that creates the desired friction reduction. Therefore, while it may not be possible to perform a test in a wellbore for the specific treatment fluid, one can formulate a test treatment fluid to be tested in a laboratory to identify if the amount of pre-hydration and concentration of the pre-hydrated friction reducer will provide the stated friction reduction.

Figure 1:
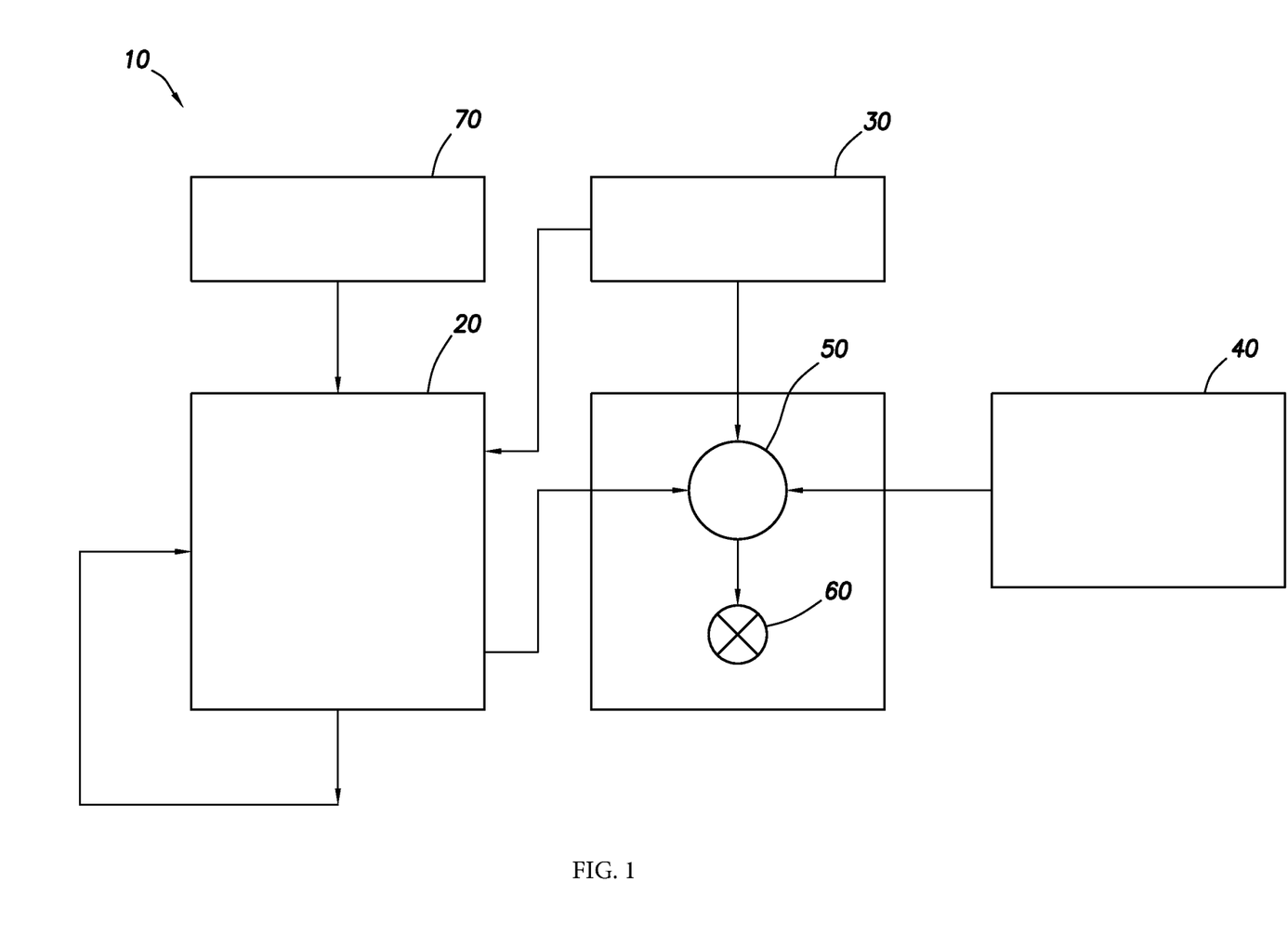
FIG. 1 is a diagram illustrating a pre-hydration and blender system for forming a treatment fluid according to certain embodiments.

Turning to the figures, FIG. 1 is a schematic showing a system 10 for treating a subterranean formation. The system 10 can include a pre-hydration apparatus. The pre-hydration apparatus can include a static mixer 20. The pre-hydration apparatus can include a first inlet configured to introduce a friction reducer into the static mixer 20. The pre-hydration apparatus can include a friction reducer source 70.

The friction reducer can be water soluble. As used herein, the term "water soluble" means that at least 1 gram dissolves in 1 liter of the water. The friction reducer can be a polymer, for example, a homopolymer or a copolymer. The polymer can be an anionic polymer, a cationic polymer, a nonionic polymer, or an amphoteric polymer. The friction reducer can be hydratable in water. As used herein, the phrase "hydratable in water" means the ability to absorb water and swell.

A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. Polymer molecules can be cross-linked. As used herein, a "cross-link" and all grammatical variations thereof is a bond between two or more polymer molecules. Cross-linked polymer molecules can form a polymer network.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x m_x$$

where $w_x$ is the weight fraction of molecules whose weight is $M_x$.

The friction reducer can be selected from a polysaccharide, or a synthetic polymer, or any combination thereof. The synthetic polymer can be a polyacrylamide, a polyacrylamide derivative, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and any combination thereof. By way of example and without limitation, a copolymer friction reducer can be poly(acrylamide-co-acrylic acid), an acrylamide copolymer comprising at least one monomer selected from 2-acrylamido-2-methyl-propane sulfonic acid, acrylamido tertiary butyl sulfonic acid, or acrylic acid, and the related salts or esters of any of the foregoing. The polymeric friction reducer according to any of the fracturing fluids can be a non-cross-linked polymer. The polymeric friction reducer can have a molecular weight less than or equal to 5 million. The polymeric friction reducer can have a molecular weight less than or equal to 1 million.

The friction reducer can be introduced into the mixer 20 from the friction reducer source 70 as a neat friction reducer. As used herein, a "neat friction reducer" means the composition of the friction reducer before introduction into the pre-hydration apparatus. Accordingly, the neat friction reducer can be in a dry, powdered form or in a liquid form. If the neat friction reducer is in powdered form, then the friction reducer source 70 can be an auger, for example. If the neat friction reducer is in liquid form, then the friction reducer source 70 can include a container and a pump. The neat friction reducer in liquid form can include the friction reducer and water. The neat friction reducer in liquid form can also be an emulsion with the water as the external phase and a hydrocarbon liquid as the internal phase. The neat friction reducer in liquid form can also be an invert emulsion with a hydrocarbon liquid as the external phase and the water as the internal phase. An invert emulsion may be useful to prevent premature hydration of the neat friction reducer in the water. The neat friction reducer can be included in the liquid form, such that the friction reducer has an activity in the range of 15% to 50% of the liquid (e.g., the water or the water and hydrocarbon liquid of an emulsion or invert emulsion). According to any of the embodiments, the activity of the friction reducer in the neat liquid form is in the range of 20% to 35%. It is to be understood that while it may be possible to mix the friction reducer in dry form with a water-based liquid on-the-fly at the wellsite to produce a neat liquid form, the "neat friction reducer" is preferably introduced into the pre-hydration apparatus in its original form from the supplier and not mixed at the well site.

The pre-hydration apparatus can also include a fluid source 30. The fluid from the fluid source 30 can be water. The water according to any of the embodiments can be selected from the group consisting of freshwater, brackish water, saltwater, produced water, and any combination thereof. The fluid can include dissolved solids, for example, water-soluble salts. The salt can be selected from the group consisting of sodium chloride, calcium chloride, calcium bromide, potassium chloride, potassium bromide, magnesium chloride, sodium bromide, cesium formate, cesium acetate, and any combination thereof. The fluid from the fluid source 30 can be introduced into the pre-hydration apparatus via a second inlet (not shown).

As shown in FIG. 1, the fluid from the fluid source 30 can be introduced directly into the mixer 20 or into the stream of the neat friction reducer from the friction reducer source 70 to the mixer 20. If the fluid from the fluid source 30 is introduced into the stream of the neat friction reducer, then both the fluid and the neat friction reducer would then enter the mixer 20 as opposed to the fluid entering the mixer 20 separately.

The mixer 20 can mix the neat friction reducer and the fluid to form a mixed fluid. The mixer 20 can be a static mixer. A static mixer typically includes a tube element containing molded protrusions that mixes fluids and materials flowing through the mixer. With no moving parts, static mixers utilize the energy of the flow stream to generate consistent, cost-effective, and reliable mixing. Other types of mixers can be utilized instead of a static mixer without departing from the scope of the disclosure. The neat friction reducer can be introduced into the mixer 20 using one or more pumps, flow control valves, flow meters, tubulars, inlets, and outlets (not shown in the figures). The neat friction reducer and the fluid can be introduced into the mixer 20 in a predetermined weight and/or volume, such that a desired concentration of the friction reducer in the mixed fluid is achieved. The neat friction reducer and the fluid can be introduced into the mixer 20 of the pre-hydration apparatus at a desired flow rate. The desired flow rate can vary and can be selected, such that the desired final concentration of the pre-hydrated friction reducer is achieved in the mixed fluid. The desired concentration of the neat friction reducer in the mixed fluid can be in the range of 0.1% to 5% or 0.75% to 1.25% by volume of the mixed fluid. For a neat friction reducer in dry form, the desired concentration of the neat friction reducer can be in the range of 0.8 to 41 pounds per gallon of the fluid from the fluid source 30.

The mixed fluid can have a desired viscosity. The desired viscosity can be less than or equal to the viscosity wherein the mixed fluid can be pumped. Too high a viscosity can render the mixed fluid unpumpable; while too low a viscosity can undesirably result in an excess of water in the treatment fluid. The viscosity of the mixed fluid can be in the range of 1 to 120 cP. The concentration of the friction reducer in the mixed fluid can also be selected such that the mixed fluid has the desired viscosity. The concentration and viscosity are directly related. Accordingly, the viscosity can be decreased by decreasing the concentration of the friction reducer or the viscosity can be increased by increasing the concentration of the friction reducer. Although not shown in FIG. 1, the pre-hydration apparatus can further include a second fluid source and/or an additive source that feeds into the static mixer 20 or other components of the pre-hydration apparatus, such as the line from the friction reducer source 70 to the mixer 20. The second fluid source can introduce a second fluid into the pre-hydration apparatus. The second fluid can be a hydrocarbon liquid. The additive source can introduce one or more additives, including but not limited to, viscosity reducers, into the mixer 20. The second fluid and/or the additives can be used to reduce the viscosity of the mixed fluid.

According to any of the embodiments, the neat friction reducer and the fluid are retained within the pre-hydration apparatus for a desired amount of time, hereinafter called the "retention time." The retention time can be in the range of 1 min. to 15 min. The retention time can be selected, such that the treatment fluid or a test treatment fluid achieves a 60% or greater friction reduction in half the time compared to a comparable treatment fluid or test treatment fluid wherein the friction reducer is not pre-hydrated. The retention time can be selected, such that the treatment fluid or a test treatment fluid achieves a 60% or greater friction reduction in less than 3 min., or less than 2 min. compared to a comparable treatment fluid or test treatment fluid wherein the friction reducer is not pre-hydrated. While a friction reducer that is pre-hydrated would be added to a base fluid of the treatment fluid as a mixed fluid, a friction reducer that is not pre-hydrated would be added directly to the base fluid of the treatment fluid. The retention time can be selected to equal the initial hydration time of the friction reducer. The retention time can be selected to fall between the initial hydration time and the final hydration time of the friction reducer. By way of example, if the initial hydration time is 1 min. and the final hydration time is 15 min., then the retention time can be selected to be in the range of 1 min. to 15 min. The retention time can also be selected to be greater than or equal to the final hydration time of the friction reducer.

Several components or factors can be adjusted to control the retention time. By way of a first example, the dimensions of the static mixer 20 can be selected to provide the desired retention time. Generally, larger dimensions (e.g., the diameter and length) of the mixer 20 will increase the retention time. By way of a second example, the flow rate of the neat friction reducer and the flow rate of the fluid through the mixer 20 can also be adjusted to provide the desired retention time. Generally, a lower flow rate will increase the retention time. By way of a third example, the pre-hydration apparatus can also be designed to provide the desired retention time. For example, if the necessary flow rate through the mixer 20 is such that the desired retention time is not possible, then the length of the mixer 20 may be increased. By way of a fourth example, the shear rate of the fluid within the mixer 20 can also be adjusted to provide the desired retention time. Generally, a higher shear rate will reduce the hydration time, which will also shorted the retention time while also providing a fully pre-hydrated friction reducer. According to this example, the length of the mixer 20 may not need to be increased if the shear rate is sufficient to pre-hydrate the friction reducer.

Another way to provide the desired retention time is to pump the mixed fluid (i.e., the neat friction reducer and the fluid) through a loop wherein the mixed fluid exits the mixer 20 through a tubular or pipe and reenters the mixer 20, for example, as shown in FIG. 1. The number of cycles through the loop can be selected to provide the desired retention time. The number of cycles can range from 1 to 10 depending, in part, on the time it takes for the mixed fluid to flow through the loop. By way of example, if it takes 30 seconds for the mixed fluid to complete one cycle and the desired retention time is 2 min., then a total of 4 cycles may be needed.

Yet another way to provide the desired retention time is to connect two or more mixers 20 together in series. The first static mixer can receive the neat friction reducer and the fluid and optionally the second fluid and/or additives and form a mixed fluid. The mixed fluid can then be pumped into a second mixer, then into a third mixer, and so on, and then into a pump and blender apparatus 50 for forming the treatment fluid. The use of two or more mixers can increase the retention time. These embodiments may be useful when the dimensions of the mixer cannot be adjusted or other parameters, such as flow rate or shear rate, cannot be adjusted.

The pre-hydration apparatus can include an outlet. The mixed fluid can exit the mixer 20 via the outlet. The mixed fluid can then flow into a pump and blender apparatus 50. It is to be understood that the pre-hydration of the friction reducer is to be performed on-the-fly at the well site and not performed off site and then transported to the well site. The pre-hydration apparatus can include other components at a variety of locations not shown in the figures. The other components can include, but are not limited to, pumps, flow control valves, flow meters, inlets, outlets, and pipes. One of ordinary skill in the art can design the pre-hydration apparatus based on the disclosures herein, such that pre-hydration of the friction reducer is achieved. Accordingly, one of ordinary skill in the art can select the exact configuration and spacing between the friction reducer source 70, the fluid source 30, the mixer 20, and any other components necessary to fully pre-hydrate the friction reducer.

The treatment fluid can be a stimulation fluid. The stimulation fluid can be a fracturing fluid. The treatment fluid can include proppant. As used herein, the term "proppant" means a multitude of solid particles. The proppant can be naturally occurring, such as sand, or synthetic, such as a high-strength ceramic. Suitable proppant materials include, but are not limited to, sand (silica), walnut shells, sintered bauxite, glass beads, plastics, nylons, resins, other synthetic materials, and ceramic materials. Mixtures of different types of proppant can be used as well. The concentration of proppant in a fracturing fluid can be in any concentration known in the art, and preferably will be in the range of from about 0.01 kilograms to about 3 kilograms of proppant per liter of the base fluid (about 0.1 lb/gal to about 25 lb/gal). The size, sphericity, and strength of the proppant can be selected based on the actual subterranean formation conditions to be encountered during the fracturing operation.

The system 10 can include a proppant source 40 and a pump and blender apparatus 50 and resides at the surface at a well site where a well 60 is located. The treatment operation can be a fracturing operation. The proppant source 40 can include a proppant for combining with the treatment fluid. The system 10 can also include additional additive sources (not shown) that provides one or more additional additives (e.g., gelling agents, weighting agents, and/or other optional additives) to alter the properties of the treatment fluid.

The treatment fluid includes a base fluid. The base fluid can be the solvent or the external phase of the treatment fluids. The base fluid can include water. The base fluid can include a hydrocarbon liquid as an internal phase of the base fluid. The base fluid can include dissolved or undissolved additives.

The pump and blender apparatus 50 can receive the mixed fluid from the mixer 20 and the base fluid from the fluid source 30 or a different fluid source (not shown) and blend the fluids with other components, including proppant from the proppant source 40 and/or additional additives. The resulting treatment fluid mixture can be pumped into the well 60 under a pressure sufficient to create or enhance one or more fractures in a subterranean zone, for example, to stimulate production of fluids from the zone. The mixer 20, the fluid source 30, and/or the proppant source 40 can each be equipped with one or more metering devices (not shown) to control the flow of fluids, proppant, and/or other compositions to the pump and blender apparatus 50. The metering devices can facilitate the pumping. The pump and blender apparatus 50 can source from one, some, or all of the different sources at a given time, and can facilitate the preparation of fracturing fluids using continuous mixing or on-the-fly methods. Thus, for example, the pump and blender apparatus 50 can provide just fracturing fluid into the well at some times, just proppant at other times, and combinations of those components at yet other times.

One of the many advantages to the pre-hydration apparatus is the ability to alter the concentration of the friction reducer in the treatment fluid in smaller increments. Prior to the discovery of the pre-hydration apparatus, the smallest increment that a friction reducer could be added to the treatment fluid was 0.05 gallons per thousand gallons (gpt) of the base fluid. The pre-hydration apparatus can be designed (e.g., the volume of the neat friction reducer, the volume of the fluid, and the flow rates), such that the concentration of the pre-hydrated friction reducer in the mixed fluid can be added to the base fluid in increments as low as 0.0005 gpt. This significant advantage can not only reduce the cost of the friction reducer, but can also decrease any environmental impact on the subterranean formation.

Figure 2:
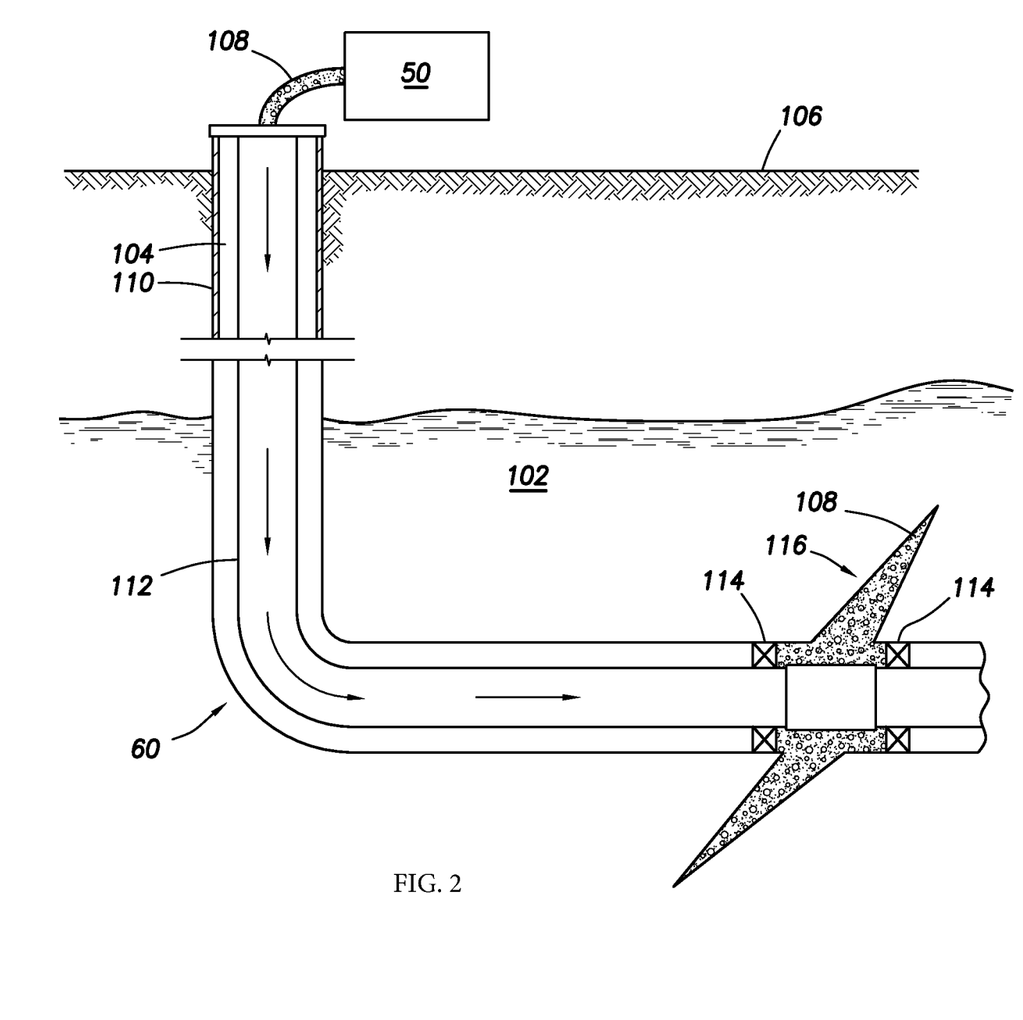
FIG. 2 is a diagram illustrating a well system in which the treatment fluid can be used.

The step of introducing the treatment fluid can include pumping the treatment fluid into the subterranean formation. FIG. 2 shows the well 60 during a fracturing operation in a portion of a subterranean formation 102. It is to be understood that while the discussion regarding FIG. 2 is directed to a fracturing operation using a fracturing fluid, other types of wellbore operations using different types of treatment fluids can be performed. The subterranean formation 102 can be penetrated by a well 60. The well 60 can be, without limitation, an oil, gas, or water production well, an injection well, or a geothermal well. The well 60 can also be an offshore well. The step of introducing can also include introducing the fracturing fluid into the well. The well includes a wellbore 104. The wellbore 104 extends from the surface 106, and the fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro jetting and/or other tools.

The well 60 is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and/or other tools or well devices that control a flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. The methods also include creating or enhancing one or more fractures within the subterranean formation using the fracturing fluid. When the fracturing fluid 108 is introduced into wellbore 104 (e.g., in FIG. 2, the wellbore interval located between the packers 114) at a sufficient hydraulic pressure, one or more fractures 116 may be created in the subterranean formation 102. The proppant particulates in the fracturing fluid 108 can enter the fractures 116 where they may remain after the fracturing fluid flows out of the wellbore. The proppant can be placed into the one or more fractures during the step of introducing. The proppant can form a proppant pack within the one or more fractures.

The pre-hydrated friction reducer from the pre-hydration apparatus can provide a reduction in friction of the treatment fluid by at least 50%, at least 60%, or at least 70% in a time from 1 min. to 10 min. after addition to the base fluid in the pump and blender apparatus 50.

The pre-hydrated friction reducer of the mixed fluid can be added to the base fluid in a concentration in the range from 0.0001% to 5% weight by weight (% w/w) of the base fluid. The concentration of the pre-hydrated friction reducer in the base fluid can be selected to provide a desired percent friction reduction to the treatment fluids.

Any of the treatment fluids can be pumped at a desired flow rate and pressure. For a fracturing fluid, the frac fluid is preferably pumped at a flow rate and pressure that is above the fracture pressure of the subterranean formation in order to create or enhance one or more fractures.

The treatment fluid can include a cross-linked polymer. The cross-linked polymer can be a viscosifying agent. The cross-linked polymer can be selected from guar, xanthan, and combinations thereof. The cross-linked polymer can be in a concentration in the range of about 1 to 120 pounds per thousand gallons (pptg) of the base fluid or 0.12 g/L to 14.4 g/L. Any of the treatment fluids can have a viscosity in the range of 1 cP to 50 cP, a viscosity in the range of 8 cP to 50 cP, or a viscosity in the range of 10 cP to 20 cP.

The treatment fluids can further include other additives. The other additives can include, but are not limited to, tackifying agents, resins, curable resins, curing agents for a curable resin, oxygen scavengers, alcohols, scale inhibitors, fluid-loss additives, oxidizers, bactericides, and biocides.

An embodiment of the present disclosure is a system for treating a subterranean formation comprising: a pre-hydration apparatus comprising: a mixer; a first inlet configured to introduce a friction reducer into the mixer; a second inlet configured to introduce a fluid comprising water into the mixer, wherein the mixer mixes the friction reducer and the fluid to form a mixed fluid; and an outlet; a base fluid; a wellbore, wherein the wellbore penetrates the subterranean formation; and a pump and blender apparatus configured to: receive the base fluid and the mixed fluid via the outlet; blend the base fluid and the mixed fluid to form a treatment fluid; and pump the treatment fluid into the wellbore. Optionally, the system further comprises wherein the pre-hydration apparatus further comprises a friction reducer source configured to provide the friction reducer to the mixer via the first inlet. Optionally, the system further comprises wherein the friction reducer is in a neat form when introduced into the mixer. Optionally, the system further comprises wherein the friction reducer is a polymer. Optionally, the system further comprises wherein the polymer is selected from the group consisting of a polyacrylamide, a polyacrylamide derivative, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, and any combination thereof. Optionally, the system further comprises wherein the concentration of the friction reducer in the mixed fluid is in the range of 0.1% to 5% by volume of the fluid. Optionally, the system further comprises wherein the mixed fluid has a viscosity in the range of 1 to 120 cP. Optionally, the system further comprises wherein the friction reducer and the fluid are retained within the pre-hydration apparatus for a desired amount of time. Optionally, the system further comprises wherein the desired amount of time is selected such that the treatment fluid achieves a friction reduction greater than or equal to 60% in ½ the time compared to a control treatment fluid wherein the friction reducer is not pre-hydrated. Optionally, the system further comprises wherein the desired amount of time is selected such that the treatment fluid achieves a friction reduction greater than or equal to 60% in less than 3 min. Optionally, the system further comprises wherein the pre-hydration apparatus further comprises a flow loop, wherein the mixed fluid exits the mixer, flows through the flow loop, and re-enters the mixer. Optionally, the system further comprises wherein the pre-hydration apparatus comprises two or more mixers connected together in series. Optionally, the system further comprises wherein the pre-hydrated friction reducer of the mixed fluid is in a concentration in the range from 0.0001% to 5% weight by weight of the base fluid. Optionally, the system further comprises wherein the treatment fluid is a fracturing fluid, and wherein the treatment fluid further comprises proppant.

Another embodiment of the present disclosure is a method of treating a subterranean formation comprising: pre-hydrating a friction reducer, wherein the friction reducer is a polymer, and wherein the friction reducer is hydratable in water; adding the pre-hydrated friction reducer to a base fluid to form a treatment fluid; and introducing the treatment fluid into the subterranean formation. Optionally, the method further comprises wherein the concentration of the friction reducer in the mixed fluid is in the range of 0.1% to 5% by volume of the fluid. Optionally, the method further comprises wherein the friction reducer is pre-hydrated in a pre-hydration apparatus, wherein the pre-hydration apparatus comprises: a mixer; a first inlet configured to introduce a neat form of the friction reducer into the mixer; a second inlet configured to introduce a fluid comprising water into the mixer, wherein the mixer mixes the friction reducer and the fluid to form a mixed fluid; and an outlet. Optionally, the method further comprises wherein the friction reducer and the fluid are retained within the pre-hydration apparatus for a desired amount of time, wherein the desired amount of time is in the range of 1 min. to 15 min. Optionally, the method further comprises wherein the pre-hydrated friction reducer is in a concentration in the range from 0.0001% to 5% weight by weight of the base fluid. Optionally, the method further comprises wherein the treatment fluid is a fracturing fluid, and wherein the treatment fluid further comprises proppant.

Examples

To facilitate a better understanding of the various embodiments, the following examples are given.

Figure 3:
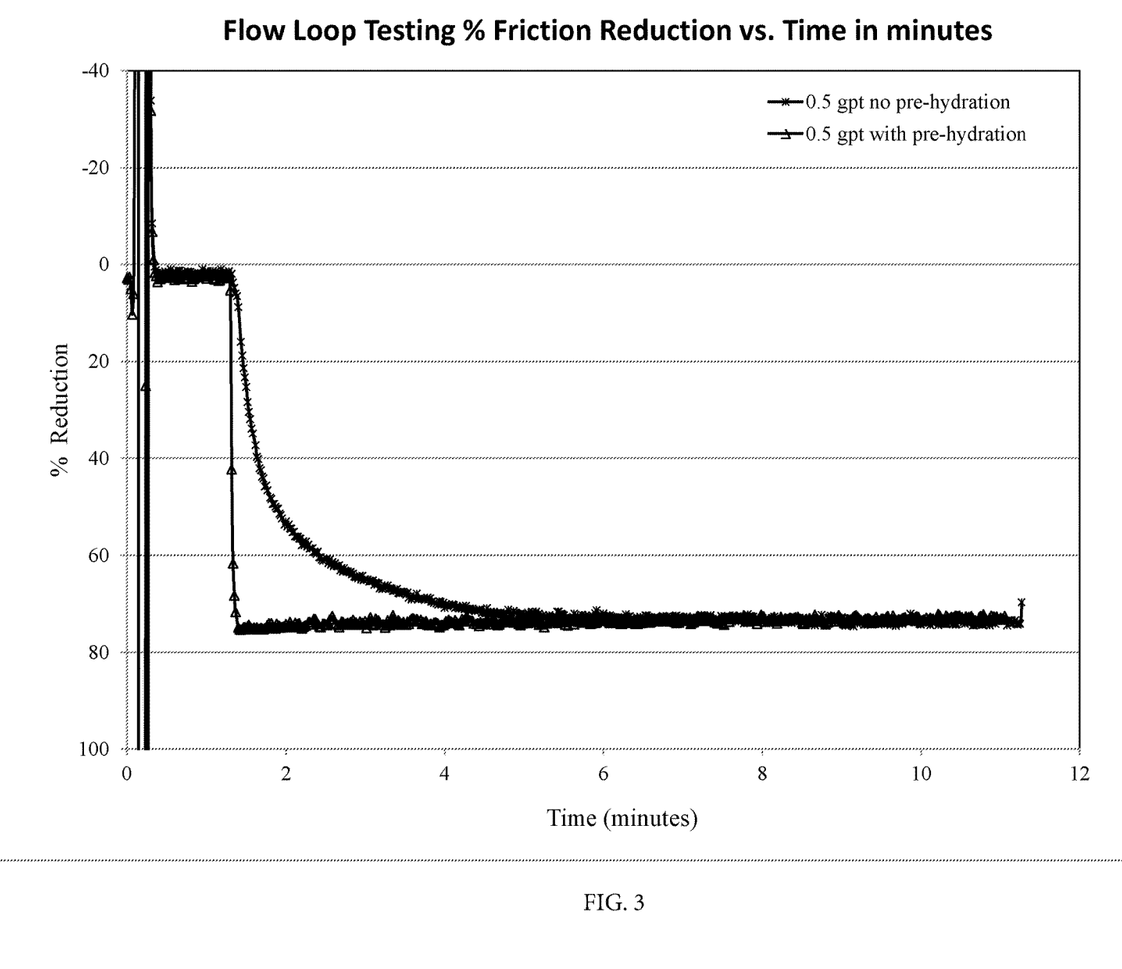
FIG. 3 is a line graph of percentage of friction reduction versus time in minutes of a friction reducer with and without pre-hydration.

FIG. 3 is a line graph showing friction reduction versus time of two different test fluids. A control test fluid did not contain a pre-hydrated friction reducer, while the other fluid contained a pre-hydrated friction reducer. The pre-hydrated friction reducer was prepared as follows: A pre-hydration apparatus was constructed as a loop having an inlet for a neat friction reducer, a water pump, a flow control valve, a flow meter, an inline mixer, and a drain valve. The neat friction reducer was an anionic polyacrylamide in liquid emulsion form having an activity in the range of 25% to 35% in the emulsion. The neat friction reducer was injected into the loop containing tap water at a concentration of 1% by volume of the water. The water pump was run at a flow rate of 3 gallons per minute (gpm) for 5 minutes to form a mixed fluid of the friction reducer and water and allow the friction reducer to hydrate in the water. The mixed fluid was then flowed from the drain valve and used as the pre-hydrated friction reducer shown in FIG. 3.

Friction loop tests were carried out for a water-based friction reducer slurries containing the neat friction reducer (for the control) and the pre-hydrated friction reducer as follows: 0.5 gallons per thousand gallons (gpt) of the neat friction reducer emulsion or the pre-hydrated friction reducer mixed fluid was added to tap water in the friction loop, and friction reduction was measured at a flow rate of 10 gpm and a temperature of 72° F. (22.2° C.).

As shown in FIG. 3, the control fluid without the pre-hydrated friction reducer reached a maximum friction reduction of about 75% in approximately 6 min. However, the fluid containing the pre-hydrated friction reducer obtained a maximum friction reduction in less than 2 min. The initial hydration time was also approximately 30 seconds less for the pre-hydrated friction reducer. This indicates that the pre-hydrated friction reducer can significantly reduce the final hydration time (i.e., increase the rate of hydration) of the friction reducer. As can also be seen, the pre-hydrated friction reducer also increased the friction reduction value in the beginning of the friction loop test and showed maximum friction reduction performance immediately after being added to the water in the friction loop, compared to the control fluid without pre-hydrating the friction reducer. This indicates that the friction reducer was completely pre-hydrated when added to the water in the friction loop. Accordingly, the pre-hydrated friction reducer would significantly enhance the performance of the friction reducer in wellbore operations, such as fracturing operations.

Figure 4:
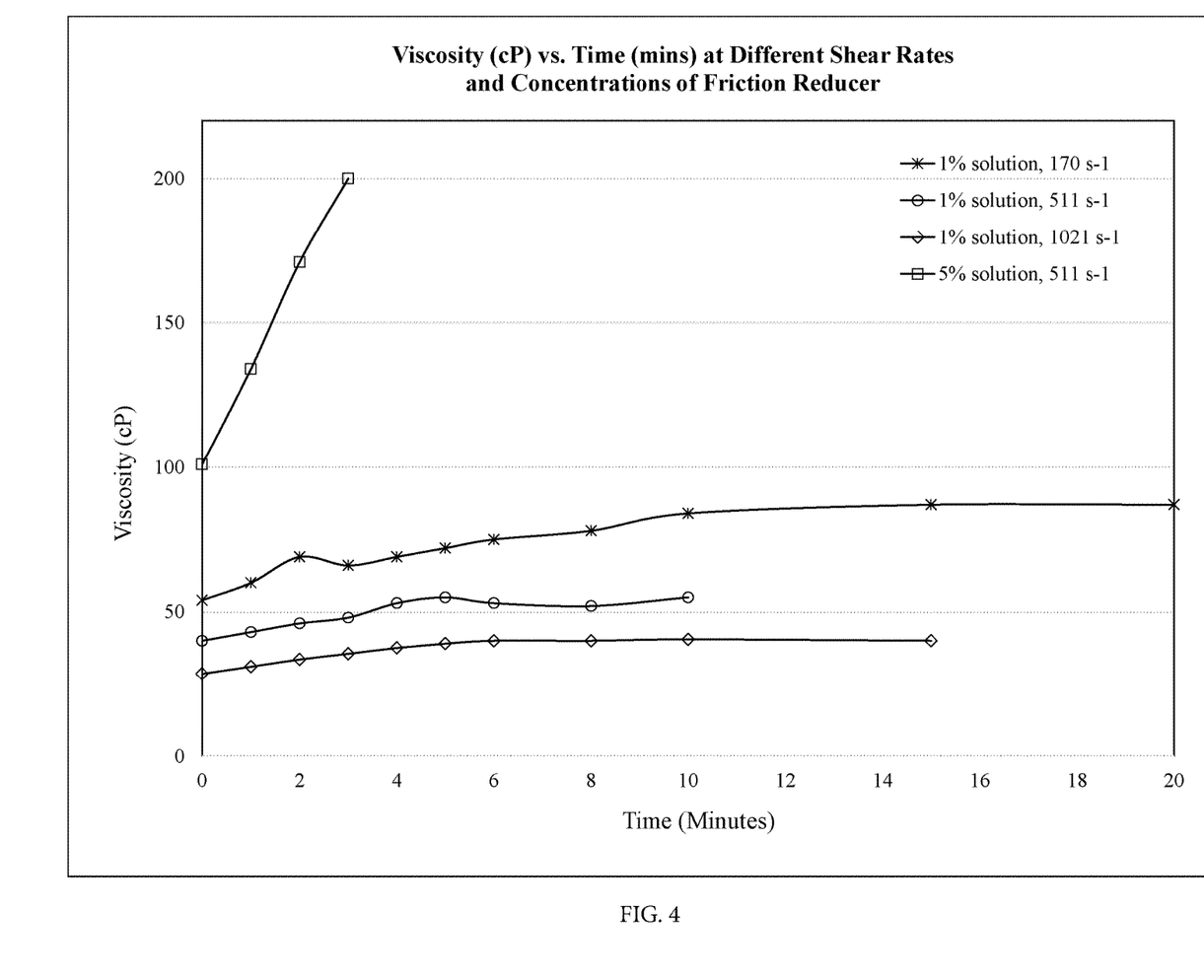
FIG. 4 is a line graph of viscosity (cP) versus time in minutes of a pre-hydrated friction reducer fluid at different shear rates and concentrations.

FIG. 4 is a line graph of viscosity testing to determine the viscosity of a pre-hydrated friction reducer mixed fluid. The mixed fluids were prepared using the pre-hydration apparatus and process described above regarding FIG. 3. The neat polyacrylamide friction reducer was added to the tap water of the pre-hydration apparatus at a concentration of either 1% or 5% by volume of the tap water. Viscosity testing was performed after blending the pre-hydrated friction reducer mixed fluid for 1 min. using a FANN® model 35 viscometer at different shear rates at a temperature of 72° F. (22.2° C.).

As can be seen in FIG. 4, of the fluids having a 1% pre-hydrated friction reducer concentration, the lowest viscosity of about 30 cP was seen with the highest shear rate of 1,021 s$^{-1}$. As can also be seen, the viscosity of all three of the fluids having a 1% pre-hydrated friction reducer concentration was less than 100 cP. This indicates that at this concentration, the fluids had desirable viscosity and the fluids would be pumpable. When the concentration of the pre-hydrated friction reducer was increased to 5% by volume, the viscosity quickly reached about 200 cP. This indicates that a 5% concentration may be too high to achieve a desired viscosity and pumpable fluid. This also indicates that other additives, such as a viscosity reducer, may need to be included in the pre-hydration apparatus in order to achieve the desired viscosity. The also indicates that the shear rate of the static mixer for pre-hydrating the friction reducer can be increased to provide a lower viscosity to the mixed fluid. A higher shear rate can also decrease the retention and hydration time, which can also help keep the viscosity to a desirable value.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole, such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives, such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A system for treating a subterranean formation comprising:
   a pre-hydration apparatus comprising:
      a mixer;
      a first inlet configured to introduce a friction reducer into the mixer;
      a second inlet configured to introduce a fluid comprising water into the mixer, wherein the mixer mixes the friction reducer and the fluid to form a mixed fluid; and
      an outlet,
      wherein the pre-hydration apparatus pre-hydrates the friction reducer on-the-fly at a well site, wherein the friction reducer and the fluid are retained within the pre-hydration apparatus for a desired retention time, wherein the desired retention time is in the range of 1 to 15 minutes, and wherein the desired retention time is selected such that a treatment fluid achieves a friction reduction greater than or equal to 60% in ½ the time compared to a control treatment fluid wherein the friction reducer is not pre-hydrated;
   a base fluid;
   a wellbore, wherein the wellbore penetrates the subterranean formation; and
   a pump and blender apparatus configured to: receive the base fluid and the mixed fluid from the pre-hydration apparatus via the outlet; blend the base fluid and the mixed fluid to form the treatment fluid; and pump the treatment fluid into the wellbore at the well site.

2. The system according to claim 1, wherein the pre-hydration apparatus further comprises a friction reducer source configured to provide the friction reducer to the mixer via the first inlet.

3. The system according to claim 2, wherein the friction reducer is in a neat form when introduced into the mixer.

4. The system according to claim 1, wherein the friction reducer is a polymer.

5. The system according to claim 4, wherein the polymer is selected from the group consisting of a polyacrylamide, a polyacrylamide derivative, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, and any combination thereof.

6. The system according to claim 1, wherein the concentration of the friction reducer in the mixed fluid is in the range of 0.1% to 5% by volume of the fluid.

7. The system according to claim 1, wherein the mixed fluid has a viscosity in the range of 1 to 120 cP.

8. The system according to claim 1, wherein the desired retention time is selected such that the treatment fluid achieves a friction reduction greater than or equal to 60% in less than 3 minutes.

9. The system according to claim 1, wherein the pre-hydration apparatus further comprises a flow loop, wherein the mixed fluid exits the mixer, flows through the flow loop, and reenters the mixer such that the friction reducer and the fluid are retained within the pre-hydration apparatus for the desired retention time.

10. The system according to claim 1, wherein the pre-hydration apparatus comprises two or more mixers connected together in series such that the friction reducer and the fluid are retained within the pre-hydration apparatus for the desired retention time.

11. The system according to claim 1, wherein the pre-hydrated friction reducer of the mixed fluid is in a concentration in the range from 0.0001% to 5% weight by weight of the base fluid.

12. The system according to claim 1, wherein the treatment fluid is a fracturing fluid, and wherein the treatment fluid further comprises proppant.

13. A method of treating a subterranean formation comprising:
pre-hydrating a friction reducer on-the-fly at a well site, wherein the friction reducer is a polymer, wherein the friction reducer is hydratable in water, and wherein pre-hydration of the friction reducer comprises:
adding the friction reducer to a mixer of a pre-hydration apparatus;
adding a fluid comprising water to the mixer to form a mixed fluid; and
allowing the mixed fluid to remain within the pre-hydration apparatus for a desired retention time, wherein the desired retention time is in the range of 1 to 15 minutes, and wherein the desired retention time is selected such that a treatment fluid achieves a friction reduction greater than or equal to 60% in ½ the time compared to a control treatment fluid wherein the friction reducer is not pre-hydrated;
adding the pre-hydrated friction reducer to a base fluid to form the treatment fluid; and
introducing the treatment fluid into the subterranean formation.

14. The method according to claim 13, wherein the concentration of the friction reducer in the mixed fluid is in the range of 0.1% to 5% by volume of the fluid.

15. The method according to claim 13, wherein the pre-hydration apparatus further comprises:
a first inlet configured to introduce a neat form of the friction reducer into the mixer;
a second inlet configured to introduce the fluid comprising water into the mixer, wherein the mixer mixes the friction reducer and the fluid to form the mixed fluid; and
an outlet.

16. The method according to claim 13, wherein the pre-hydrated friction reducer is in a concentration in the range from 0.0001% to 5% weight by weight of the base fluid.

17. The method according to claim 13, wherein the treatment fluid is a fracturing fluid, and wherein the treatment fluid further comprises proppant.

18. A system for treating a subterranean formation comprising:
a pre-hydration apparatus comprising:
a mixer;
a first inlet configured to introduce a friction reducer into the mixer;
a second inlet configured to introduce a fluid comprising water into the mixer, wherein the mixer mixes the friction reducer and the fluid to form a mixed fluid; and
an outlet,
wherein the pre-hydration apparatus pre-hydrates the friction reducer on-the-fly at a well site, and wherein the pre-hydration apparatus further comprises a flow loop, wherein the mixed fluid exits the mixer, flows through the flow loop, and reenters the mixer such that the friction reducer and the fluid are retained within the pre-hydration apparatus for a desired retention time;
a base fluid;
a wellbore, wherein the wellbore penetrates the subterranean formation; and
a pump and blender apparatus configured to: receive the base fluid directly from a base fluid inlet and receive the mixed fluid via the outlet; blend the base fluid and the mixed fluid to form a treatment fluid; and pump the treatment fluid into the wellbore at the well site.

* * * * *